Feb. 24, 1942. E. C. HORTON 2,274,293
ACCESSORY SYSTEM FOR MOTOR VEHICLES
Filed May 25, 1937  3 Sheets-Sheet 1
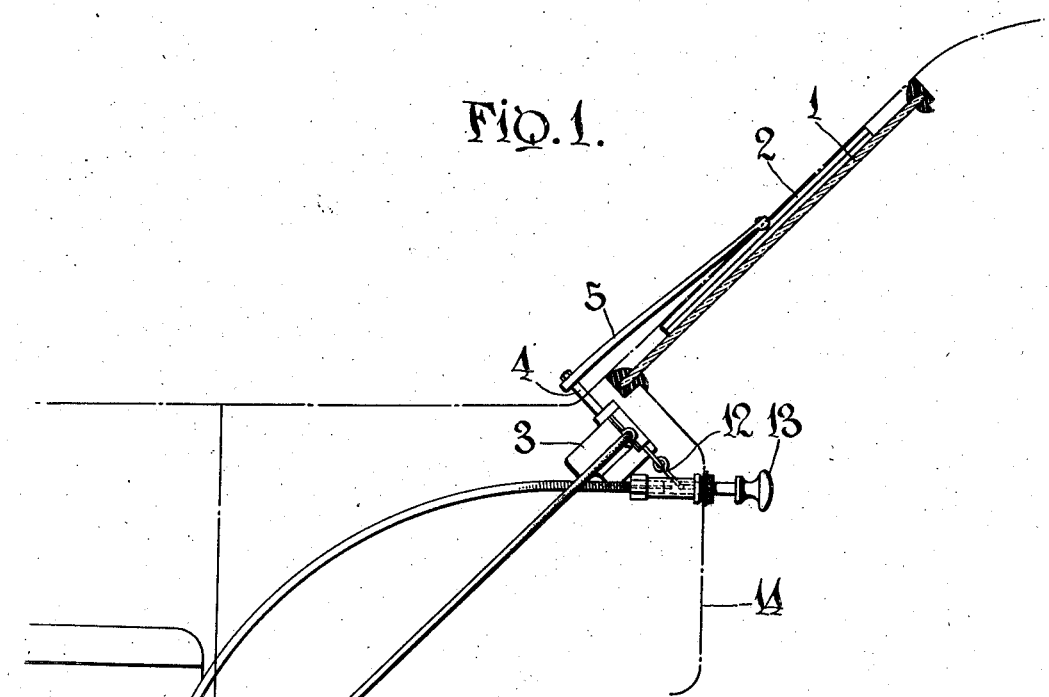
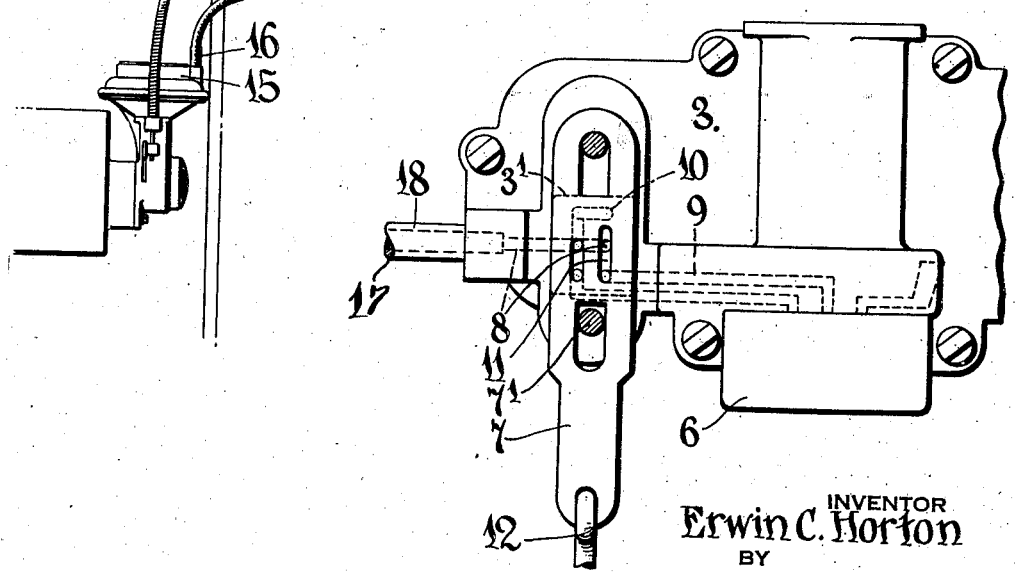
INVENTOR
Erwin C. Horton
BY
Beau, Brooks, Buckley & Beau ATTORNEYS

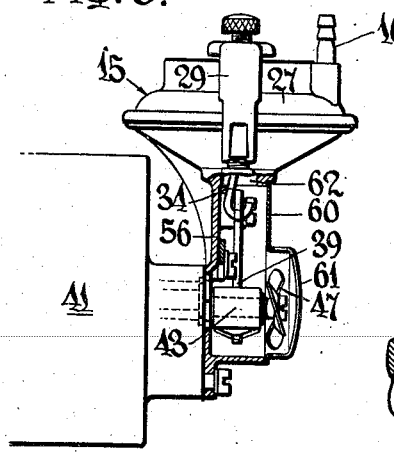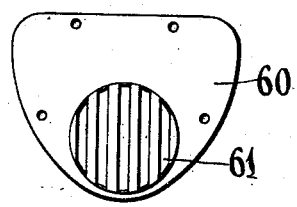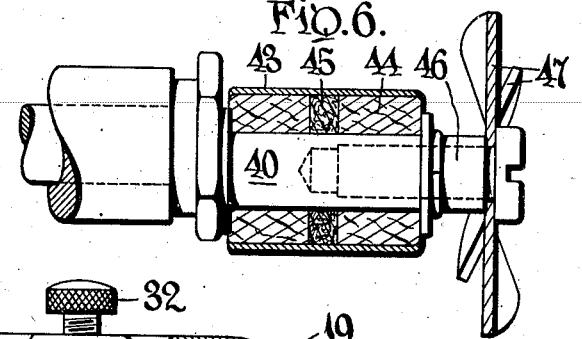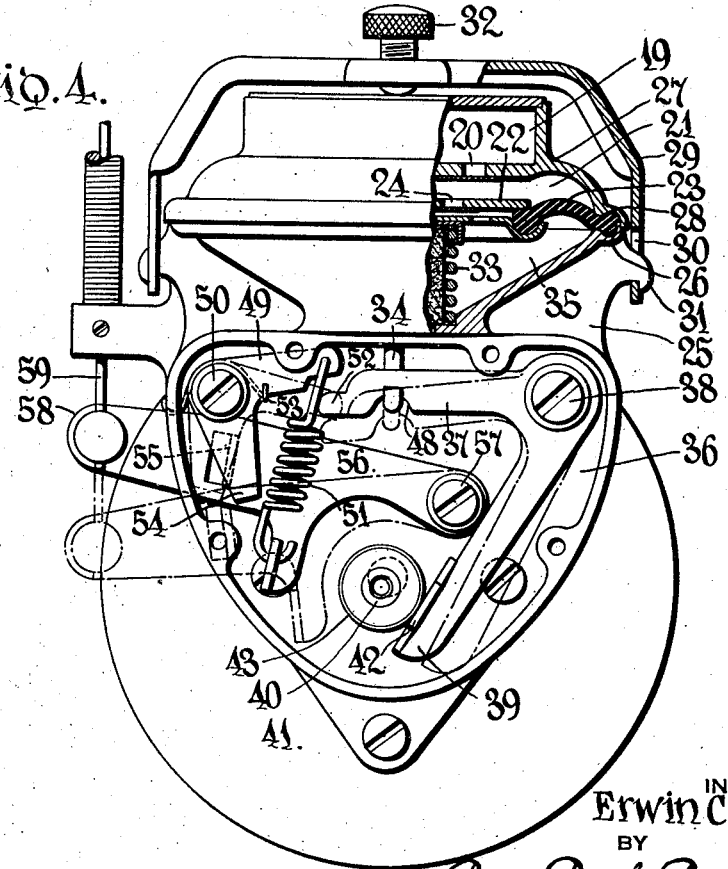

Feb. 24, 1942. E. C. HORTON 2,274,293
ACCESSORY SYSTEM FOR MOTOR VEHICLES
Filed May 25, 1937 3 Sheets-Sheet 3
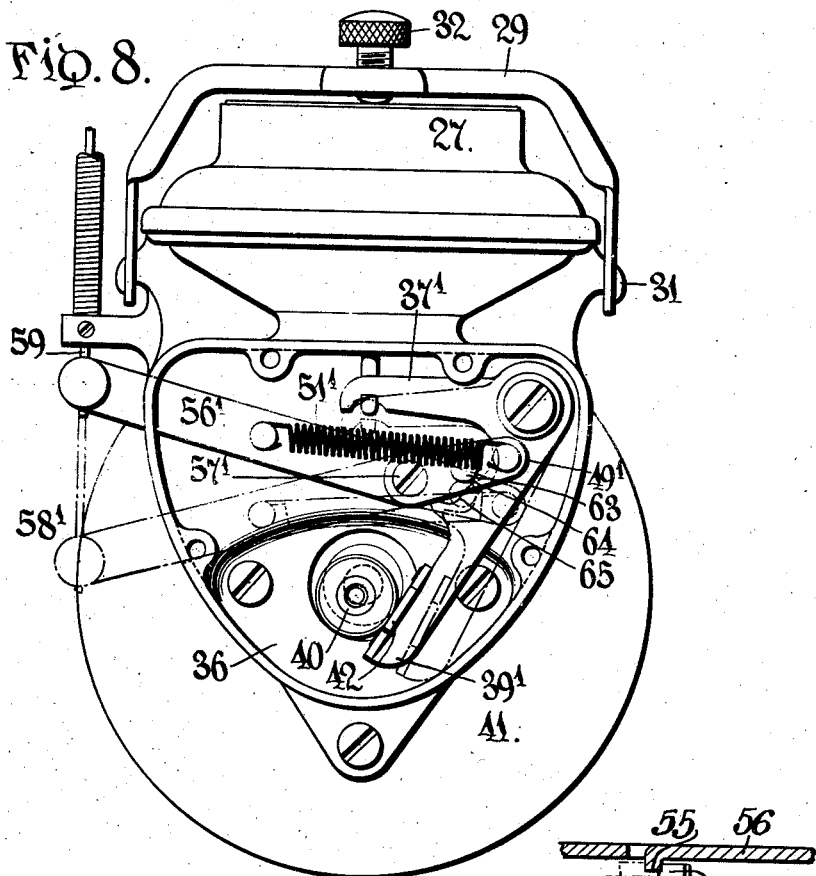
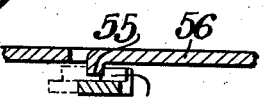
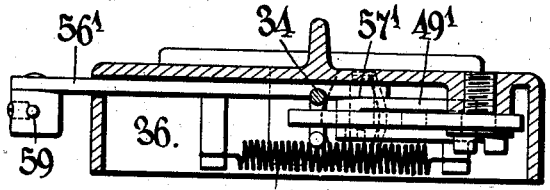
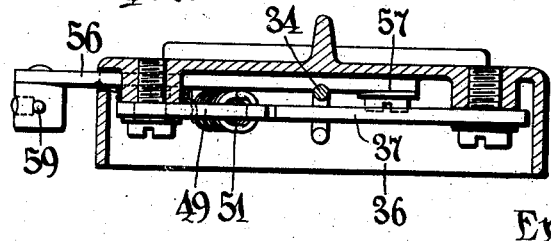
INVENTOR
Erwin C Horton,
BY
Beau, Brooks, Buckley & Beau.
ATTORNEYS Patented Feb. 24, 1942

2,274,293

UNITED STATES PATENT OFFICE 2,274,293

ACCESSORY SYSTEM FOR MOTOR VEHICLES

Erwin C. Horton, Buffalo, N. Y., assignor to Trico Products Corporation, Buffalo, N. Y.

Application May 25, 1937, Serial No. 144,687

7 Claims. (Cl. 60—60)

This invention relates to an accessory system for motor vehicles and especially to that type wherein the accessory is actuated by air or fluid pressure.

In the operation of air actuated accessories such as the windshield cleaner, by way of example, the operating pressure has heretofore been obtained through a connection to the intake manifold or, as an alternative, to an engine driven air pump. The intake manifold as a source of suction is not altogether dependable, since the suction fluctuates according to engine throttle position. The main objection to an engine driven pump as a source of actuating pressure is that the pump is continuously operated whether the accessory is in operation or not and, in the case of a windshield cleaner which is utilized only for a fraction of the time that the vehicle is in use, it is obvious that the pump is needlessly being actuated throughout the greater portion of the time. During this period of cleaner disuse the pump is operating against a closed passage so that not only are the actuating parts of the pump subjected to excessive and unnecessary wear and tear, but certain portions are unduly subjected to abnormal pressure conditions which are injurious to the system.

The present invention has for an object to provide an accessory system of the type having the operating pressure supplied by a pump, which is practical and satisfactory in operation and one wherein the pump is arrested with the turning off of the accessory whereby the life and efficiency of the accessory system is considerably enhanced and prolonged. The invention further has for its object to provide a pressure generator for accessory systems embodying control means by which it may be rendered inoperative when the accessory is in disuse, the generator and its control means being designed for mounting as an entirety in the motor vehicle power plant.

In the drawings illustrating the preferred embodiments of the present invention

Fig. 1 depicts in fragment a motor vehicle with the present invention applied thereto;

Fig. 2 is a partial view of the accessory which is illustrated herein by way of example;

Fig. 3 is a side elevation of one form of the pressure generator unit, portions of the same being broken away for the sake of clearness;

Fig. 4 is a similar view of the unit in front elevation with the cover of the drive chamber removed;

Fig. 5 is an elevation of the drive chamber cover;

Fig. 6 is a detailed view of the driving cam;

Fig. 7 is a horizontal transverse sectional view through the drive chamber showing the relation of the parts of the release mechanism with respect to the driving parts;

Fig. 8 is a view similar to Fig. 4 but showing a modified form of pump release mechanism;

Fig. 9 is a view similar to Fig. 7 through the modified drive chamber of Fig. 8; and Fig. 10 is a horizontal sectional view showing in detail the arrangement of the kicker restraining lugs.

Referring more particularly to the drawings, numeral 1 designates the windshield of a motor vehicle, 2 the wiper for maintaining clear vision therethrough, and 3 the air or suction operated motor for actuating the wiper through the shaft 4 and the arm 5. The wiper motor 3 is provided with automatic valve mechanism within a chamber 6 and is equipped with a shut off valve 7 which in one position connects the suction or operating pressure supply port 8 to the motor operating passage 9, and in its other position it connects the supply port 8 to a parking port 10 by which the wiper 2 is moved to one side of the field of vision. A windshield cleaner motor of this construction is illustrated and claimed in Patent No. 1,840,233, granted January 5, 1932, to Henry Hueber, and, therefore, a further detained description is not given herein. Suffice it to say that when the shut off valve is in its closed or upper position with respect to Fig. 2, ports 8 and 9 are disconnected, while ports 8 and 10 are connected by valve passage 11 to return the wiper 2 to a parked position adjacent one end of its path of movement. The shut off valve is actuated by a push-pull member 12 suitably connected to a knob 13 arranged on the instrument panel 14 of the motor vehicle.

The pump illustrated herein for supplying the accessory motor with its operating pressure is generally indicated by the numeral 15 and shown as having a nipple 16 connected by a conduit 17 to a similar nipple 18 on the accessory motor. For practical reasons the pump is of the suction type so that when it is in operation air is drawn through the accessory motor, the conduit 17, the nipple 16, an inlet chamber 19 of the pump or pressure generator, through a valved inlet port 20 and into the pump chamber 21. A fluid displacing member or piston, preferably of the diaphragm type, is depicted at 22, the marginal portion being flexible, preferably of rubber and bulged upwardly, as at 23, to provide for a rolling action rather than a buckling movement when the piston is reciprocated. From the chamber 21 the air is exhausted through a valved outlet port 24.

The pump housing is sectional for ease of accessibility to the working parts of the pump. The housing comprises a mounting section 25, which has a seat 26 to receive the peripheral edge of the diaphragm 23, and a chambered section 27 which has a complemental seat 28 cooperating with the seat 26 to securely embrace such peripheral edge. The two sections are removably clamped together by a bail 29 having terminal loops 30 engaged over anchor hooks 31 on the mounting section 25, a pressure screw 32 being carried by the bail to exert clamping pressure on the chambered section 27 when the parts are assembled in the relation illustrated in Fig. 4.

The fluid displacing member of the pump is operated in any practical manner. In the form illustrated in Fig. 4 it is urged upwardly or in one direction by a spring 33 and is pulled in the opposite direction by a force applied on the connecting rod 34. The pump section 25 is provided with an exhaust chamber 35 into which the air is exhausted from the pump chamber 21, and within the exhaust chamber the spring 33 is conveniently housed. The connecting rod 34 extends through this chamber and downwardly into a transmission chamber 36 which encloses a power mechanism as well as a release mechanism for the pump. The power mechanism illustrated comprises a bell crank lever which is pivoted at 38 in the chamber 36 and has one arm 37 connected to the lower end of the pump rod 34. The other arm 39 of the bell crank lever extends into the path of movement of a driving cam 40. This driving member may be any readily accessible member of the vehicle power plant, such as a crank extension of the shaft of the generator 41, so that as it moves in a definite path it will engage the arm 39 and cooperate with the spring 33 in reciprocating the fluid displacing member 22 of the pump, the spring serving to hold the arm 39 against the driving member 40 at all times of pump operation to avoid noise and lost motion. The arm 39 is provided with a wearing face or shoe 42 while the driving crank extension carries a roller bearing 43 provided with oil impregnated fibre or wooden bushings 44. An oil containing pad 45 may be interposed between the wooden bushings for better lubrication, and since the wooden bushings are poor conductors of heat, the crank part 40 is provided with a heat conducting pin 46 and heat radiating fins or vanes 47 to dissipate the heat generated within the bushings when operating at a high speed. The arm 37 which extends substantially horizontal is provided with a seat 48 in which the lower end of the pump rod 34 is engaged, this seat serving to confine the location of the pump rod. The throw of the driving cam is quite small and, therefore, the movement of the connecting rod 34 and the fluid displacing member are confined to a definite and substantially perpendicular path.

The release mechanism functions to disconnect the pump from its drive so that when the accessory is not in use the pump will likewise be at rest and the accessory system relieved from unnecessary wear and tear.

According to the release mechanism depicted in Fig. 4, a kicker 49 is pivoted by a pin 50 and adapted to be actuated by a spring 51 against a finger 52 on the arm 37 to rock the companion arm 39 out of the path of the driving cam. The kicker 49 is normally elevated by a spring 53 from the path of the finger 52 when the pump is in operation during which time the heavier spring 51 is untensioned. When being set for action the kicker is prevented from engaging the finger by the engagement of the kicker carried lug 54 by the flange 55. This arresting action is maintained until the force in the spring 51 can be built up sufficiently to completely remove the arm 39 from the path of the driving cam. The flange 55 is carried on a trigger or release lever 56 which is pivoted at 57 within the transmission chamber 36 and connected to the kicker 49 by the spring 51. The lever 56 is designed to be moved to a pump arresting position from the pump operating position, indicated at 58 in Fig. 4, by the push pull wire 59.

As the lever 56 is moved downwardly, the spring 51 is distorted from the normal and the spring energy is stored up therein because the lug 54 is held arrested by the flange 55 on which latter the lug rides as the tension on spring 51 is increased during the continued depression of the lever, so that by the time the flange 55 has moved sufficiently far to permit the lug 54 to ride thereoff the spring 51 will quickly snap the kicker against the finger 52 and move the arm 39 from the path of the driving cam. When in such position the parts are held against the tension of the pump actuating spring 33 and consequently the several movable parts are held against noisy vibration.

The operating wire 59 of the release mechanism is extended to a point readily accessible to the motorist and in the form of the invention shown, it has been connected to the knob 13 so that when the use of the accessory is discontinued, the pump likewise is thrown out of operation. The timing of these functions is such that the windshield cleaner will be moved to its parked position concurrently, or practically so, with the actuation of the kicker so that the wiper will be brought to its parked position substantially at the same time, or slightly in advance thereof, so that when the pump is inoperatively disposed the wiper will also be positioned without the field of vision. Obviously the spring 51 when acting on the kicker has sufficient spring force built up to counteract the spring 33 and hold the bell crank lever inoperatively related to the driving cam 40.

When it is desired to again use the accessory, the motorist will pull outwardly upon the knob 13 to operatively connect the ports 8 and 9 of the accessory motor and concurrently elevate the release lever 56 during which elevation the right hand side of the lug 54 will be retained by the left hand side of the flange 55, as seen in Fig. 4, until it rides off the lower end of the latter, whereupon the pump spring 33 will bring the power arm 39 of the bell crank lever against the driving cam 40, while the light spring 53 will remove the kicker 49 from the path of the finger 52.

The chamber 36 contains the operating bell crank lever and its driving cam, as well as the release mechanism, and is conveniently closed by a removable cover plate 60 which is provided with a grill 61 through which the exhaust air from the pump finds exit to the outside atmosphere, the transmission chamber communicating with the exhaust chamber 35 through an opening 62.

In the modification disclosed in Figs. 8 and 9, the kicker 49' is yieldably held in its inoperative position by the spring 51' until the latter has been moved across a dead center position relative to the points of anchorage of the opposite ends of the spring whereupon the spring will function quickly to snap the kicker to its operative position. The release lever 56' is pivotally mounted by the screw 57' which also serves as a pivotal mounting for the kicker 49', and when the lever 56' is moved downwardly to the dotted line position 58', by the push pull wire 59, the line of spring force crosses the pivotal axis 57' for operating the kicker. The action of the kicker 49' differs from that of the kicker 49 (Fig. 4) in that it acts directly upon the arm 39' of the bell crank lever, rather than on the arm 37'. For this direct engagement the kicker 49' is provided with a cross pin 63 to cam against the shaped edge 64 of the arm 39'. The kicker 49' may be bifurcated to straddle the arm 39' for guidance thereby, and when the kicker is in its operative position, the camming pin 63 will rest in a seat 65 which serves to hold the arm 39' in its inoperative position.

When it is desired to again bring the pump into operation for actuating the accessory, the wire or flexible cable 59 is pulled to elevate the lever 56' for shifting the line of spring force above or across the pivotal axis 57' upon which the spring will snap the kicker upwardly to the full line position so as to release the pump actuating member 37', 39'.

To facilitate the final disengagement of the pump from its operative association with the driving part of the power plant, the pressure line between the pump and the accessory is vented to the atmosphere, and for this purpose the valve passage 11 is adapted to ride off the raised pad 3' constituting the valve seat on which the valve 7 is adapted to slide within certain limits as defined by the guide pins 7'. The venting operation will occur subsequent to the parking of the wiper so as to relieve the pump chambers 19, 21 of any pressure tending to pull upwardly on the piston 22. In other words, when the spring 51 is functioning to move the shoe 42 from the path of the driving cam 40 it will only be necessary to counteract and overcome the force of spring 33 free of any retarding influence that would otherwise be developed by the pressure differential acting on the piston. It is, therefore, obvious that as the valve 7 is pushed inwardly it initially functions to close the suction supply passage 9 and subsequently thereto to connect the supply port 8 directly to the parking port 10 whereby the wiper 2 will be quickly moved to its parked position. Up to this time the snap action or kicker of the pump release mechanism has not been brought into full operation. It is, however, desirable to bring it into operation practically at the same time with the parking of the wiper, or slightly thereafter. In the illustrated embodiments of this invention the removal of the shoe from its drive cam occurs subsequent to the parking of the wiper so that upon a continued inward movement of the valve 7, the passage 11 will override the edge of the valve seat pad 3' so as to vent the parking port 10 to the atmosphere. This breaks the high vacuum within the suction line 17 and the connected pump chambers 19, 21 so as to relieve the pump piston 22 of substantially the greater part, if not all, of the pressure differential. Consequently the disconnecting spring 51 (51') will merely have to act against the spring 33 in finally removing the shoe from the path of the driving cam. The wiper will remain in its parked position by gravity where the actuating shaft 4 is mounted at the lower side of the windshield.

The pump with its release mechanism is a self contained unit which is mountable and demountable as an entity, the release mechanism acting to render the pump wholly inoperative when the accessory is not in use. The pump operating mechanism is definitely related to the driving part of the vehicle power plant instantaneously upon the spring action of the kicker either by being wholly engaged therewith or entirely removed therefrom. The pump control may be operated automatically with the parking of the windshield cleaner when that type of accessory is used. By disconnecting the pump from its drive when the accessory is not in use, the life of the accessory system is materially increased, since the accessory is in use for a very small fraction of the time during which the vehicle is in operation.

The foregoing detailed description has been given for ease in understanding the disclosure and is merely illustrative of the inventive principles herein involved which may be applied to other physical embodiments without departing from the spirit or scope of the invention claimed.

What is claimed is:

1. An accessory system for motor vehicles having a power plant with a driving part comprising, in combination therewith, an air actuated windshield cleaner motor and a wiper actuating member moved thereby automatically and successively to and fro between limit positions, an air pump connected to the motor for supplying operating pressure thereto, arresting means connecting the motor to the pump for normal operation thereby and adjustable to a motor arresting position for connecting the motor to the pump in a manner to arrest said wiper actuating member adjacent one of its limit positions regardless of the phase of operation of said actuating member at the time of initiation of the operation of the arresting means; means operable by the driving part of the power plant for operating the air pump, and control means for the air pump and said arresting means, said control means being manually movable to initiate and discontinue operation of said pump and to render said arresting means effective and ineffective with respect to its motor arresting function, said control means being arranged upon manual movement thereof to move the arresting valve means to its motor arresting position in which the motor is connected therethrough to the pump and by such manual movement to also discontinue the operation of the air pump.

2. An accessory system for motor vehicles having a power plant with a driving part comprising, in combination therewith, an air actuated windshield cleaner motor having a parked position and valve means connectible to arrest said motor in parked position, an air pump connected to the motor for supplying operating pressures thereto, means operable by the driving part of the power plant for operating the air pump, means movable to dissociate said air pump and said driving part, and control means for said motor and said air pump, said control means being manually movable to initiate and discontinue operation of said motor and said pump and having therefor connection with the valve means of the motor and with the movable means for dissociating the air pump and its driving part, a snap action interposed between said control means and said movable means whereby initial manual movement of said control means discontinues operation of said motor and concurrently loads said snap action whereby the valve means for parking the motor is connected while the snap action is being loaded and before a sufficient loading thereof is applied to cause the snap action to snap and effect dissociation of the air pump and its driving part.

3. An accessory system for motor vehicles having a power plant with a driving part comprising, in combination therewith, a fluid pressure operated accessory, an air pump connected to the accessory for supplying operating pressures thereto, means operable by the driving part of the power plant for operating the air pump, means movable to dissociate said air pump and said driving part, and control means for said accessory and said air pump, said control means being manually movable to initiate and discontinue operation of said motor and said pump and having therefor connection with the motor and the movable means for dissociating the air pump and its driving part, a snap action interposed between said control means and said movable means whereby initial manual movement of said control means loads said snap action and simultaneously operates to discontinue operation of said accessory subsequent to which the snap action, upon further manual movement, becomes sufficiently loaded to later snap and dissociate said air pump from its driving part.

4. A windshield cleaner system for motor vehicles, having a wiper with a fluid motor for reciprocating the same, a pump connected to the motor for supplying the latter with fluid under pressure, means for arresting the motor to park the wiper at one end of its path of movement, means for operating the pump from a driving part of the vehicle power plant and including a driven member with resilient means for holding it operatively related to said driving part, a disconnect device embodying a member for rendering the driven member inoperative and spring means releasable to operate said rendering member, and a manual control operable to actuate the arresting means and release the spring means successively whereby the wiper will be parked prior to the disconnection of the pump from the driving part.

5. An accessory system for motor vehicles having a power plant with a driving part comprising, in combination therewith, an air actuated windshield cleaner motor having a parked position and valve means connectible to arrest said motor in parked position, an air pump connected to the motor for supplying operating pressure thereto, means operable by the driving part of the power plant for operating the air pump, means movable to dissociate said air pump and said driving part, and control means for said motor and said air pump, said control means being manually movable to initiate and discontinue operation of said motor and said pump and having therefor connection with the valve means of the motor and the movable means for dissociating the air pump and its driving part, means interposed between said control means and said movable means for effecting a time delay whereby the movable means is operative to dissociate the air pump and its driving part during the latter part of the manual movement of said control means and whereby the valve means of the motor is preliminarily connected for arresting said motor in parked position.

6. An accessory system for motor vehicles having a power plant with a driving part comprising, in combination therewith, an air actuated windshield cleaner motor having a parked position and valve means connectible to arrest said motor in parked position and arranged, upon further movement, to vent said motor to the atmosphere, an air pump connected to the motor for supplying operating pressure thereto, means operable by the driving part of the power plant for operating the air pump, means movable to dissociate said air pump and said driving part, and control means for said motor and said air pump, said control means being manually movable to initiate and discontinue operation of said motor and said pump and having therefor connection with the valve means of the motor and the movable means for dissociating the air pump and its driving part, means interposed between said control means and said movable means for effecting a time delay whereby the movable means is operative to dissociate the air pump and its driving part during the latter part of the manual movement of said control means and whereby the valve means of the motor is preliminarily connected for arresting said motor in parked position and finally arranged to vent said system to the atmosphere with the air pump in dissociated condition.

7. An accessory system for motor vehicles having a power plant with a driving part comprising, in combination therewith, an air actuated windshield cleaner motor having a parked position and valve means connectible to arrest said motor in parked position, an air pump connected to the motor for supplying operating pressures thereto, means operable by the driving part of the power plant for operating the air pump, means movable to dissociate said air pump and said driving part, and control means for said motor and said air pump, said control means being manually movable to initiate and discontinue operation of said motor and said pump and having therefor connection with the valve means of the motor and the movable means for dissociating the air pump and its driving part, resilient means interposed between said control means and said movable means for effecting a time delay whereby the movable means is operative to dissociate the air pump and its driving part during the latter part of the manual movement of said control means and whereby the valve means of the motor is preliminarily connected for arresting said motor in parked position.

ERWIN C. HORTON.